US007989506B2

(12) United States Patent
Corbelli

(10) Patent No.: US 7,989,506 B2
(45) Date of Patent: Aug. 2, 2011

(54) METHOD AND APPARATUS FOR DISPERSION OF HIGH-SURFACE-AREA, LOW-BULK-DENSITY FUMED SILICA

(75) Inventor: Paul A. Corbelli, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 1132 days.

(21) Appl. No.: 11/696,232

(22) Filed: Apr. 4, 2007

(65) Prior Publication Data

US 2008/0245265 A1    Oct. 9, 2008

(51) Int. Cl.
*B01F 3/12* (2006.01)
*C01B 33/141* (2006.01)

(52) U.S. Cl. ............ 516/111; 516/34; 516/81; 106/31.9
(58) Field of Classification Search .................... 516/34, 516/81, 111; 106/31.9
See application file for complete search history.

(56) References Cited

U.S. PATENT DOCUMENTS

| 4,599,363 | A | * | 7/1986 | Miles et al. ................... 514/770 |
| 5,116,535 | A | | 5/1992 | Cochrane |
| 5,246,624 | A | * | 9/1993 | Miller et al. ................... 516/86 |
| 5,342,597 | A | * | 8/1994 | Tunison, III ................... 423/335 |
| 6,403,162 | B1 | | 6/2002 | Tokunaga et al. |
| 6,695,907 | B2 | | 2/2004 | Scharfe et al. |

FOREIGN PATENT DOCUMENTS

| EP | 1 228 891 | | 3/2006 |
| GB | 2 229 715 | A | 10/1990 |
| JP | 2006-076841 | | 3/2006 |
| WO | WO 2004/085311 | | 10/2004 |

OTHER PUBLICATIONS

Rockwell Automation ("Agitation and Mixing Processes", Rockwell International Corporation, Publication D-7747, Mar. 2000).*

* cited by examiner

*Primary Examiner* — Ling-Siu Choi
*Assistant Examiner* — Chun-Cheng Wang
(74) *Attorney, Agent, or Firm* — Chris P. Konkol; Andrew J. Anderson

(57) ABSTRACT

The present invention generally relates to methods of preparing stable colloidal dispersions of nanoparticulate size fumed silica particles. More particularly, the invention relates to a method of rapidly wetting and dispersing fumed silica powder for obtaining a coatable dispersion, particularly in the manufacture of inkjet media.

19 Claims, 1 Drawing Sheet

METHOD AND APPARATUS FOR DISPERSION OF HIGH-SURFACE-AREA, LOW-BULK-DENSITY FUMED SILICA

The present invention generally relates to methods of preparing stable colloidal dispersions of nanoparticulate size fumed silica particles. More particularly, the invention relates to a method of rapidly wetting and dispersing fumed silica powder for obtaining a coatable dispersion, particularly a coatable dispersion for use in the manufacture of inkjet media.

BACKGROUND OF THE INVENTION

Nanoparticulate silica colloids have been known for many years and have many uses in industrial and consumer products. A nanoparticle has dimensions on the order of a molecular scale, typically on the order of about 1 to 100 nm, or $10^{-9}$ to $10^{-7}$ meters. For present purposes, colloidal particles having an average diameter of about 300 nm or less are relevant.

Colloidal particles find use in a broad variety of applications such as pigments for paints, in cosmetic products, in paper products, as polishing media in semiconductor electronics, to name only a few. An application of particular importance is the use of colloids in the production of inkjet media.

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of an aqueous mixture, for example, comprising water and one or more organic materials such as a monohydric alcohol, a polyhydric alcohol, or the like.

An inkjet recording element typically comprises a support having on at least one surface thereof at least one ink-receiving layer. There are generally two types of ink-receiving layers (IRL's). The first type of IRL comprises a non-porous coating of a polymer with a high capacity for swelling, which non-porous coating absorbs ink by molecular diffusion. Cationic or anionic substances may be added to the coating to serve as a dye fixing agent or mordant for a cationic or anionic dye. Typically, the support is a smooth resin-coated paper and the coating is optically transparent and very smooth, leading to a very high gloss "photo-grade" inkjet recording element. However, this type of IRL usually tends to absorb the ink slowly and, consequently, the imaged receiver or print is not instantaneously dry to the touch.

The second type of ink-receiving layer or IRL comprises a porous coating of inorganic, polymeric, or organic-inorganic composite particles, a polymeric binder, and optional additives such as dye-fixing agents or mordants. These particles can vary in chemical composition, size, shape, and intra-particle porosity. In this case, the printing liquid is absorbed into the open interconnected pores of the IRL, substantially by capillary action, to obtain a print that is instantaneously dry to the touch. Typically the total interconnected inter-particle pore volume of porous media, which may include one or more layers, is more than sufficient to hold all the applied ink forming the image.

Basically, organic and/or inorganic particles in a porous layer form pores by the spacing between the particles. The binder is used to hold the particles together. However, to maintain a high pore volume, it is desirable that the amount of binder is limited.

A porous inkjet recording medium that is glossy usually contains at least two coated layers in addition to the support: a base layer nearer to the support and a glossy image-receiving layer further from the support. Layers comprising smaller particles, for example inorganic particles, as described in U.S. Pat. No. 6,630,212 to Bermel et al. or U.S. Pat. No. 6,641,875 to Sadasivan et al., are capable of producing high gloss levels. Colloidal particles, as used herein, can refer to either (1) colloidal secondary particles or aggregates of primary particles, such as in the case of fumed metallic oxide, for example, fumed alumina or fumed silica, or (2) colloidal primary particles, for example, hydrated alumina or colloidal silica.

U.S. Pat. No. 5,116,535 to Cochrane discloses a method of preparing an aqueous dispersion of fumed silica at concentrations of at least about 35 weight % by high shear mixing followed by slight dilution to the desired concentration, such that the dispersion in the mixer, before dilution, will have a fumed silica concentration at least about 5% greater than the desired final concentration of fumed silica in the aqueous colloidal dispersion of fumed silica. The aqueous dispersion may be passed through a filter to remove grit and any agglomerated particles. Low surface area fumed silica (less than 75 $m^2/g$) is preferred. An aqueous colloidal dispersion having a viscosity of below about 1000 centipoise that will not gel for at least 2 hours is obtained without a stabilizer such as an alkali or base.

U.S. Pat. No. 5,246,624 to Miller et al. discloses a similar method additionally including pre-acidifying the aqueous medium and, after dispersing the fumed silica, adding a pH-increasing stabilizer such as ammonium hydroxide. Again, low surface area fumed silica (less than 75 $m^2/g$) is preferred.

U.S. Pat. No. 4,599,363 to Miles et al. discloses a method for making a paste comprising a vehicle of humectant and water, with water content below 35% and a bodying agent such as colloidal or fumed silica (referred to as "pyrogenic silica") at a concentration below 20%. The solids are introduced into the closed mixing vessel, by vacuum induction, to the area of highest turbulence at the bottom of the mixing tank. The mixer disclosed is a mixing screw appropriate for a paste, distinct from a high-shear mixer for preparing a coating dispersion of fumed silica as in previously mentioned prior art patents. In the paste of Miles et al., the principal particles are abrasives comprising silica gels with particle sizes significantly above 1 micron, which particles are unsuitable for glossy photo-quality inkjet media. Also, the high-humectant level composition is unsuitable for forming a porous ink-receiving layer.

U.S. Pat. No. 6,695,907 to Scharfe et al. discloses a method of preparing a dispersion of fumed silica that has been doped with $AlCl_3$ using a rotor-stator system. In reference to Table 1 of U.S. Pat. No. 6,695,907, the examples of low surface area silica were dispersible, but it was not possible to produce a 40% solids dispersion of AEROSIL 90 silica (90 $m^2/g$ as measured by BET) using this system.

U.S. Pat. No. 6,403,162 to Tokunaga et al. discloses a method for making an inkjet recording material comprising dispersing fumed silica. A cationic polymer having a molecular weight of 10,000 or less is added to an aqueous medium prior to the introduction of the fumed silica. The cationic polymer is used to prevent agglomeration of fine silica particles added as a solid powder. U.S. Pat. No. 6,403,162 discloses primary mixing to prepare a slurry using propeller stirring, turbine type stirring, homomixer type stirring, etc., and then secondary mixing carried out with a high-pressure homogenizer, a ball mill, or the like. The use of high-pressure homogenizer treatment for a fumed silica of surface area 300

$m^2/g$ in a comparative example without cationic polymer resulted in aggregation and sedimentation after six days.

European Patent No. 1,228,891 to Ohya et al. discloses, for use in making an inkjet recording element, the preparation of a low-solids dispersion of AEROSIL 300 silica by vacuum induction using, for example, a JET STREAM Inductor Mixer TDS manufactured by Mitamura Riken Kogyo Co. However, a disadvantage of using a low-solids dispersion in a coating is that drying may require harsh conditions which may result in loss of product quality or may necessitate a long, expensive drying process.

U.S. Pat. No. 6,676,719 to Lortz et al. discloses, for use in various applications, including coating of paper and chemical-mechanical polishing of semiconductor substrates, a process of pre-dispersing and wetting a fumed silica, employing a high pressure homogenizer, for example, dispersion and suction mixer from Ystral. Dispersion was completed with a Z 66 type rotor/stator from Ystral. Lortz et al. found that alkali doped silica provided greater stability than undoped silica. In a comparative example using AEROSIL 130 silica, it was not possible to draw in the entire quantity of solids above 20 weight % due to high viscosity caused by partial agglomeration. Potassium doping was proposed as a solution to substantially improve the wetting or pre-dispersion time.

Japanese patent publication No 2006-076841 by Takaaki et al. describes a two-step method for dispersing wet-process silica powder comprising, as a first or primary dispersion process step in order to obtain a silica slurry, a flow-type vacuum dispersing agitator continuously or intermittently supplying and dispersing the silica to a mixture of a dispersing agent and an aqueous dispersing medium and, as a second dispersion process step, pulverizing the silica slurry.

There is a need for an improved low-cost, efficient, industrial-scale method of preparing colloidally stable, nanoparticle dispersions of fumed silicas. Efficient wetting and dispersing of low-bulk-density, high-surface-area powders for use in high-solids coatings for glossy inkjet photo-quality media, and prevention of particle agglomeration, are particular concerns.

SUMMARY OF THE INVENTION

The present invention is directed to overcoming one or more of the problems set forth above. Briefly summarized, according to one aspect of the present invention, a process for dispersing and wetting difficult-to-wet, high-surface-area, low-bulk-density, substantially water-insoluble fumed silica powder in an aqueous medium comprises the steps of:

(a) providing a vessel and cover lid equipped with a radial flow mixer, one or more baffles parallel to the mixer shaft, means for cooling the vessel, an outlet for removing the final dispersion, and an inlet for fumed silica powder, wherein said inlet is located on the vessel bottom, as compared to the sides of the vessel, below the radial mixer and radially offset from the axis of the radial flow mixer, preferably at least partially within the radius of the radial flow mixer, to improve silica powder flow into the vessel during the process wherein the inlet for fumed silica powder is connected to, or formed by, a flush bottom valve;

(b) charging the vessel with an aqueous liquid comprising at least 50% water;

(c) subjecting the aqueous liquid in the vessel to vacuum and high-shear radial flow mixing;

(d) drawing the fumed silica powder into the vessel through said inlet, which inlet is below the surface of the aqueous liquid, while maintaining the temperature of the dispersion below 35° C., wherein the fumed silica powder is added, preferably at a flow rate of at least 5 kg/min or more, until at least 30% solids are present, preferably intermittently starting and stopping powder flow as necessary for effective incorporation and wetting of the powder;

(e) maintaining mixing for a period sufficient for effective dispersal, i.e., to break up non-colloidal aggregates of fumed silica powder;

(f) reducing solids concentration in the vessel by at least 5 percent solids, preferably at least 10 percent solids, to obtain a fumed silica dispersion having a stable concentration of colloidal particles;

(g) optionally stabilizing the colloidal particles in the fumed silica dispersion using a stabilizer; and (h) filtering the fumed silica dispersion to reduce the presence of impurities and any remaining agglomerates.

The use of a flush bottom valve in the system is advantageous for preventing unwanted deposition of the fumed silica. The space between the downstream side of the sealed valve or moveable control element, for example, the space between the ball of a ball valve and the internal vessel wall is relatively minimal or zero. Accordingly, there is little or no dead space between the sealed valve and the vessel wall, thereby preventing a substantial amount of wet fumed silica powder being present prior to, or outside, the vessel inlet.

In one embodiment, the flush bottom valve is attached, for example by welding, to the vessel wall, or in close proximity thereto, such that the distance from the control element of the valve to the inside wall of the vessel is less than two times, preferably less than one time, the diameter of the conduit supplying the fumed silica to the vessel. Alternatively, flush mounted valve can be defined by the space between the control element and the inside wall, which is preferably less than one percent, more preferably less than about 0.5 percent, most preferably less than 0.1 percent, of the volume of the vessel (when the vessel is closed during operation). Most preferably, the flush bottom valve is a ball valve and the moveable control element or ball partially or slightly extends above the internal bottom wall, thereby providing zero dead space. The bottom wall of the vessel may be slightly concave towards the ball valve in the vicinity of the inlet due to the shape of the valve flange welded to the vessel wall and consequently forming part of the vessel bottom wall around the inlet. The inlet is defined as the opening into the vessel through which the fumed silica powder enters the vessel.

It is preferred that the vessel bottom should be hemispherical in shape to minimize dead zones that could allow solids to collect and form large agglomerates.

In one embodiment, a process control scheme is employed to improve the process, wherein the flow of silica powder into the vessel is measured or calculated and wherein the power to the mixer driver and the flow through the flush bottom valve are regulated.

BRIEF DESCRIPTION OF THE DRAWINGS

The above and other objects, features, and advantages of the present invention will become more apparent when taken in conjunction with the following description and the Sole FIGURE which shows one embodiment of an apparatus for dispersing high-surface-area, low-bulk-density fumed silica in an aqueous liquid composition.

DETAILED DESCRIPTION OF THE INVENTION

Figure 1:
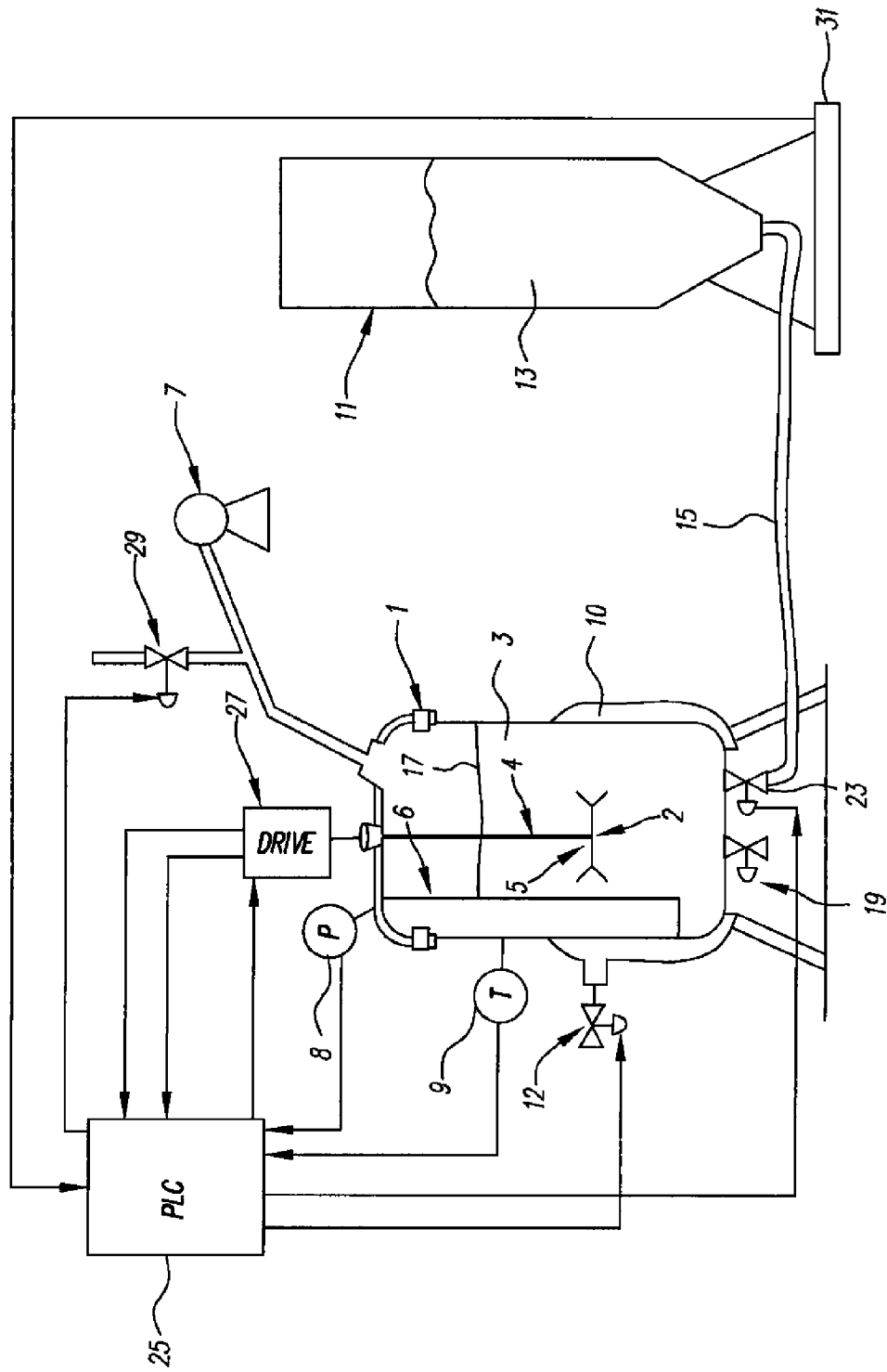

Silicon dioxide ("silica") particles, and generally metallic-oxide and semi-metallic oxide particles, can be divided roughly into particles that are made by a wet process (for example, precipitation) and particles made by a dry process (vapor phase process). The latter type of particles is also referred to as fumed or pyrogenic particles. In a vapor phase method, flame hydrolysis methods and arc methods have been commercially used. Fumed particles exhibit different properties than non-fumed or hydrated particles. In the case of fumed silica, this may be due to the difference in density of the silanol group on the surface of the particles. Fumed particles are suitable for forming a three-dimensional structure having high void ratio, which is desirable for rapid ink absorption in ink-receiving layers of inkjet recording media.

Fumed or pyrogenic particles are aggregates (secondary particles) of smaller, primary particles. Although the primary particles are not porous, the colloidal-sized aggregates contain a significant void volume, and hence are capable of rapid liquid absorption. These void-containing colloidal-sized aggregates enable a coating to retain a significant capacity for liquid absorption even when the aggregate particles are densely packed.

The present invention provides a method of preparing a dispersion of such fumed silica. As particles will be of irregular sizes, a particle size diameter can be viewed as the diameter of a sphere having the equivalent volume as the particle. It is preferred that the mean, volume weighted, particle size diameter of the secondary particles is less than about 200 nm, and more preferably less than 150 nm, most preferably less than about 100 nm. It is further preferred that at least 90 volume percent of the secondary particles of the fumed silica composition have a diameter smaller than 500 nm, more preferably smaller than 200 nm, and most preferably smaller than about 100 nm. In a preferred embodiment of the present invention, the surface area of the fumed silica particles used in the present method is 50 to 300 $m^2/g$, as determined by BET absorption, more preferably 90 to 250 $m^2/g$, and the bulk density of the fumed silica is less than 100 g/l.

A colloid is a suspension of particles in a liquid medium, the particles being so small that gravitational forces do not aggregate or settle the particles from suspension, but rather the particles are kept in suspension due to particle charging and simple Brownian motion. It is preferred that colloids contain as few particles as possible which have a diameter greater than about 1 micron, since these tend to settle, or may cause undesirable coarseness or defects in the applied product. Colloids as such are often referred to as stable colloids. A stable colloid as referenced in the examples is defined as a particulate suspension in which there is no significant evidence for aggregation of particles as determined by particle size measurement, and that there is not visible flocculation or settling of the colloid for a specified period of time, preferably at least one week after its preparation. Characteristics of an unstable colloid may include particle growth due to aggregation of the primary particles to average particle size diameters greater than about three times the original diameter, and visible settling of the colloid within one week of its preparation.

For the purpose of the present invention, the fumed silica colloid optionally may or may not contain surfactant, dispersion aide, surface-modification addenda, or the like in order to improve stability. In some cases, it may be desirable, for example, to modify the surfaces of colloidal particles in order to obtain a specific chemical function or to impart a desired physical property to the colloidal particles. Because the surface area of the present colloidal particles is generally very high, the surface properties can play an important role in the application of the colloidal particles to inkjet recording media, for example, affect the absorption or binding of the colorant in the applied ink.

It is preferred that the present fumed silica dispersion has a high concentration of solids of 30 to 80 percent, preferably greater than 30 weight % and more preferably greater than 40 weight %, subsequent to the filtering step mentioned above. However, the concentration may depend on the particle size of the fumed silica. For example, the preferred concentration for fumed silica that is 90 nm in size may be about 45 percent, versus about 40 percent for fumed silica that is 130 nm, versus about 30 percent for fumed silica that is 200 nm to 300 nm in size. Larger sized particles tend to not trap as much water.

Theoretically, the particle size of fumed silica used in a dispersion may be characterized by a number of methods, or combination of methods, including Coulter methods, light-scattering methods, sedimentation methods, optical microscopy, and electron microscopy. The particle size is, in fact, a complex parameter and is best described by a series of parameters including the mean particle size diameter, the standard deviation of the distribution, and the distribution width. This is because not all particles are the same size and shape, and the variability in particle size may be small (monodisperse) or very large (polydisperse).

Sedimentation is a simple technique of discerning the presence of large particles, since particles greater than about 1 micron will settle over time to the bottom of the container holding a suspension of such particles. This technique is often used to determine the stability of a colloid; colloids that do not visibly settle within about a week are considered stable colloids. Often, stable colloids do not visibly settle over months or even years. Sedimentation, however, may give little or no information regarding the particle size distribution of particles less than about 1 micron.

The dispersion of the invention is a stable colloid and, hence, should remain in suspension for a period of greater than a few hours, preferably greater than a few days; and more preferably greater than a week or more. This is preferred because the shelf-life of the colloid is increased.

Optical microscopy (visible light microscope) may also be used to obtain information regarding particles larger than about 1-2 microns. Electron microscopy may be used to "visualize" particles having dimensions smaller than 1 micron and even smaller than 100 nm (0.1 microns). However, electron microscopy samples only a very limited number of particles, typically less than 100 particles in a single image. Colloids, however, especially colloids having nano-sized dimensions may contain $10^{12}$ to $10^{15}$ particles per milliliter, and therefore electron microscopy may give little or no information regarding the mean particle size distribution, the standard deviation of the distribution, and the distribution width. Electron microscopy may further be misleading in that it can be used to selectively image particles having only a certain size and shape.

Light-scattering techniques, on the other hand, may sample $10^9$ or more particles and thus are capable of giving excellent colloidal particle statistics. Light-scattering techniques may be used to give the percentage of particles existing within a given interval of diameter or size, for example, 90% of the particles are below a given value. A light-scattering technique can be used to obtain information regarding mean particle size diameter, the mean number distribution of particles, the mean volume distribution of particles, standard deviation of the distribution(s) and the distribution width for nanoparticulate fumed silica particles. For colloids, it is preferred that at least 90% of the particles are less than 4-times the mean particle size diameter, and more preferably that at least 90% of the particles are less than 3-times the mean particle size diameter. The mean particle size diameter may be determined as the number weighted (mean size of the total number of particles) or as the area, volume or mass weighted mean. The volume or mass weighted mean particle size diameter is preferably determined, since larger particles having a much greater mass are more prominently counted using this technique.

For the purpose of the present invention, particle sizes referred to herein, unless otherwise indicted, are median particle sizes as determined by light scattering measurements of dispersed particles, as measured using laser diffraction or photon correlation spectroscopy (PCS) techniques employing NANOTRAC (Microtac Inc.), MALVERN, CILAS instruments, or HORIBA LA-920 Dynamic Light Scattering Nano-Particle Size Analyzer, or essentially equivalent means. For example, light scattering measurement using the latter analyzer can be used to determine if large agglomerates are still found in the dispersion after processing, due to it's ability to measure from 200 nm to 2000 μm. Unless otherwise indicated, particle sizes refer to the secondary particle size of the colloidal particle. Depending on the context herein, particle sizes may refer to the sizes prior to the present dispersion process or to the dispersed particles in the present dispersions. In the former case, particle sizes may be provided in product literature for fumed silica powder, typically obtained by dispersion of sample powder in water.

The dispersion medium for carrying out the invention is aqueous. Minor amounts of water-miscible non-aqueous solvents may be used, for example, methanol, ethanol, and acetone. In a preferred embodiment, the dispersion medium is at least 95 percent by weight water and may consist essentially of water.

For aqueous fumed-silica colloids, the zeta potential of the dispersion preferably has a maximum value greater than about ±15 mV. Stabilizers can be used to increase the zeta potential, as long as no undue adverse effects on the desired properties of the dispersion are concomitantly produced. A high zeta potential is preferred because it increases the colloidal stability of the colloid. The pH of the dispersion may be adjusted as is necessary to obtain a stable colloid. As mentioned above, the colloid stability may also be enhanced through the addition of dispersing aids or surfactants.

Stability was also determined by measuring viscosity over time. The viscosity of unstable dispersions would increase over a given period of time (hours to days).

The colloidal dispersions made in accordance with the invention are prepared by a process comprising bringing the fumed silica into a high shear mixing zone as a dry powder, that is, a solid. Incorporation and wetting of the solids may be accomplished by the velocity of the fumed silica at the introduction point and through provision of flow and energy through the high shear mixing apparatus. The mixing efficiency of the apparatus is dependent to some extent upon the type of mixing method chosen and the precise geometry and design of the mixer. For propeller-like mixers, the mixing efficiency is affected by the stir rate (rev/sec).

In accordance with a preferred embodiment of the invention, powder is introduced as a feed stream into the bottom of the vessel while the fumed silica particles are dispersed in the vessel by action of a rotary agitator. By the term "bottom" is meant below the sides of the vessel, which are substantially vertical. The bottom of the vessel may be curved but is substantially horizontal in contrast to the sides.

Preferably, effective micro and meso mixing, and resulting intimate contact of the powder with the aqueous carrier, is carried out by the introduction of the feed stream into the vessel below the impeller such that the impeller does not cause flow of the vessel contents back towards the inlet.

Preferred mixing apparatus which may be used in accordance with such embodiment includes rotary agitators of the type which have been previously disclosed for use in the paper industry, such as Cowles or Rushten turbines, and in the photographic silver halide emulsion art for precipitating silver halide particles by reaction of simultaneously introduced silver and halide salt solution feed streams. Such rotary agitators may include, e.g., turbines, marine propellers, discs, and other mixing impellers known in the art (see, e.g., U.S. Pat. Nos. 3,415,650; 6,513,965, 6,422,736; 5,690,428, 5,334, 359, 4,289,733; 5,096,690; 4,666,669; EP 1156875; and WO-0160511). Mixing apparatus which may be employed in one particular embodiment of the invention includes mixing devices of the type disclosed in Research Disclosure, Vol. 382, February 1996, Item 38213. In such apparatus, means are provided for introducing a feed stream from a remote source by a conduit which terminates close to an adjacent inlet zone of the mixing device (preferably less than one impeller diameter from the surface of the mixer impeller).

The mixing device is vertically disposed in the dispersion vessel, and attached to the end of a shaft driven at high speed by a suitable means, such as a motor. The lower end of the rotating mixing device is spaced up from the bottom of the reaction vessel, but beneath the surface of the fluid contained within the vessel. At least one baffle, optionally a plurality of baffles, typically no more than four, which inhibit horizontal rotation of the contents of the vessel, are located within the mixing device. A plurality of vertically extending baffles may optionally extend along the sides of the vessel at spaced apart intervals.

While the specific configurations of the rotary agitators which may be employed in preferred embodiments of the invention may vary significantly, they preferably will each employ at least one impeller having a surface and a diameter, which impeller is effective in creating a highly agitated zone in the vicinity of the agitator and sufficient flow throughout the rest of the vessel to inhibit agglomeration at high concentrations of solids. Preferably, the rotary agitator is a radial flow mixer such as a Cowles blade, Rushton turbine, or the like. Such a mixer also provides axial flow above and below the mixing blade. Increased speed tends to increase radial flow. The Cowles mixer is advantageous for providing more shear than flow, however, and provides less flow at a given rotational speed than other mixing devices such as a marine blade. The Cowles mixer, as will be known to the skilled artisan, is a substantially flat, circular blade with a saw tooth arrangement at the periphery.

Preferably, the tip speed of the blade during the process is greater than 1000 RPM, preferably about 3500 RPM (revolutions per minute) or about 5000 FPM (feet per minute, or 1500 meters/sec), during the dispersion process. The requisite power requirement in a preferred embodiment is 0.25 to 1 HP (horsepower) per gallon (0.05 to 0.2 kW/liter), more preferably about 0.0.75 hp (0.15 kW/liter), in order to provide the desired shear and flow. A preferred rotary agitator for use in the present invention is a Cowles blade or the like.

Referring to FIG. 1, the method comprises charging a fumed silica powder, a dry solid, to a mixing vessel; subjecting the mixture to a continuous vacuum and intimate mixing; and introducing the fumed silica powder directly into the mixture through the bottom of said mixing vessel while maintaining said vacuum and intimate mixing. It is critical to the process that the vacuum maintained on the mixing vessel be of a sufficient level to draw the fumed silica powder into the mixture at the bottom of the vessel and not allow the powder to be drawn from the surface of the solution. It is also critical to provide enough mixing energy to incorporate and wet powder solids at the rate defined by the vacuum level. In effect, the vacuum imposed on the mixture is used as the motivating force to convey the powder into the bottom of the mixing vessel, thereby creating a wet trap which continuously separates the air from the fumed silica powder as the particles are wetted.

As the powder solids are pulled into the mixing vessel, they are accompanied by entrained air that must constantly be pulled off. This is accomplished by exposing the air in the mixing operation to the constant vacuum and turbulence created by the intimate mixing. As indicated above, in a preferred embodiment of the invention, the present method for dispersing and wetting difficult-to-wet, high-surface-area, low-bulk-density, substantially water-insoluble fumed silica powder in an aqueous medium comprises the steps of: (a) providing a vessel equipped with a radial flow mixer and a baffle, means for cooling the vessel, and a sub-surface valve inlet for powder solids at the vessel bottom, wherein the inlet is radially offset from the mixer; (b) charging the vessel with a aqueous liquid comprising at least 50% water, preferably greater than 95% by weight water; (c) subjecting the contents of the vessel to vacuum and high-shear radial flow mixing; (d) drawing the fumed silica powder into the vessel through the sub-surface inlet at the bottom of the vessel, at a rate such that fluid flow is maintained, while maintaining temperature of the dispersion below 35° C., preferably below 30° C.; (e) adding powder until at least 30% solids are present, preferably greater than 40 weight %, most preferably 50 to 70 weight percent; (f) maintaining the mixing for a period sufficient to break up aggregates; (g) reducing the solids concentration by at least 5-10 percent solids and stabilizing the particles; and (h) filtering the dispersion to reduce presence of impurities and agglomerates. The inlet is advantageous in the form of a valve mounted flush to the bottom of the vessel.

The silica particles are preferably stabilized by some means, either by pH adjustment and/or the use of organic stabilizers. For anionic fumed silica dispersions, stabilization can be accomplished by adjusting the pH to approximately 10 (typically ammonia, NaOH, or KOH). For a cationic fumed silica dispersion, stabilization can be accomplished by changing the fumed silica particles to a positive charge, typically, by adding a low molecular weight cationic polymer such as poly(diallyl dimethyl ammonium chloride) (pDADMAC) and adjusting the pH to approximately 4, if necessary. Thus, depending on the particular fumed silica composition, the pH can optionally be adjusted to a pH of 8 to 10 or pH 3 to 5. Optionally, the fumed silica may be reacted with cationizing agent.

Process equipment for one embodiment of the invention is shown in the FIG. 1. A mixing vessel 1 containing an aqueous liquid medium 3 is provided with a mixing device 5 and a line to a vacuum source 7. A cooling jacket 10 surrounds at least a portion of the vessel walls. One or more bleed valves in the line to the vacuum source can be used to adjust vacuum from the vacuum pump. The mixing device 5 comprises an agitator means or mixing blade 2, mixer shaft 4, and mixer driver 27. The mixing blade may optionally be a rotary blade as shown. A baffle 6 attached to the top of the vessel, or cover thereof, extends into the aqueous liquid medium 3. At least one hopper 11 is supplied for fumed silica powder material 13. The conduit leading from the hopper preferably comprises a section having a sintered metal sleeve or liner, air from which floats the particles and thereby assists the transport and flow of the dry particles through the line 15. The hopper 11 communicates with the mixing vessel 1 through a line 15 at a point below the surface 17 of the aqueous liquid medium 3 in the mixing vessel 1, at a point where the flow is high but not directly in the radial flow of the mixing device. A discharge end 19 of the mixing vessel 1 may be provided in connection with a dispersion pump (not shown) to facilitate discharge. An inlet valve 23 is schematically shown in close proximity to the bottom of vessel 1. As indicated above, the inlet is connected to, or formed by a valve 23 that is preferably mounted flush to the bottom wall of the vessel. Preferably, the valve is a ball valve. Additional valves in line 15 or attached to hopper 11 may be optionally employed.

The valve body is preferably made from stainless steel, which may be forged, cast, machined, or fabricated. Preferably the valve body is flanged with end flanges at the upstream and downstream end. The upstream end, in one embodiment, is attached to the conduit or line 15 using bolt holes in the flange at the upstream end. The downstream end, preferably a concave flange, can be welded to the bottom wall of the vessel, in which an opening was cut, and subsequently polished to a smooth finish, thereby forming an inlet in the bottom wall for the fumed silica powder.

The valve serves to regulate the flow of the fumed silica into the vessel and should be able to form a water tight seal, so the fumed silica on the upstream side of the valve control element remains dry. Also the valve control element should not extend into the vessel to the extent that depositions can form on the control element. Hence, a ball valve is advantageous compared to a butterfly, disk, or swing check valve. However, although ball valves are preferred, valves in which the control element does not unduly extend forward can also be employed, for example, gate valves, plug valves, diaphragm valves, and the like.

Flush bottom valves, for example flush bottom ball valves, are available from a variety of commercial vendors such as Flow-Teck, a subsidiary of Bray International, Inc. (Houston, Tex.). The Flow-Teck Tank Series ball valves are designed to be welded flush to a tank bottom for drainage of tank media. Flush bottom ball valves are also commercially available from SVF Flow Controls, Inc. (Sante Fe Springs, Calif.)

As mentioned above, the flush mounting of the valve allows the system to operate without large agglomerates building up or necessitating frequent work stoppages or cleaning of the system.

A control mechanism or actuator for opening and closing the flush bottom valve can obtained from vendors of flush bottom valves, as will be appreciated by the skilled artisan. See for example, U.S. Pat. No. 5,542,643 to Breth, which discloses a pneumatic ball valve controller or operator to effect remote control of a ball valve.

In one embodiment of the present process, a baffle for the vessel is connected to the lid or cover of the vessel so that baffle attachments in the vessel are not present for deposition for fumed silica. An elongated bar attached to the cover, when the cover is lowered into the vessel, can form a baffle vertically extending along and adjacent the side of the vessel and radially extending, for a lesser distance, towards the axis of the vessel. Such a baffle is preferably a flat piece of metal that is capable of breaking up the vortex formed by the mixing device. Accordingly, the baffle causes turbulence and high shear of the fumed silica particles for improved dispersion and breaking down of particle agglomerates. While shear breaks the agglomerates, the flow from the mixer prevents the particles from agglomerating. The high concentration of particles in the vessel helps to break down agglomerates by collision. Since the mixing generates heat, a cold-water cooling jacket 10 is employed in the embodiment of FIG. 1.

A controller 25 (preferably a PLC or programmable logic controller) may be used to control mixer driver 27, in order to control the speed of mixing and/or power consumption based on speed and/or power inputs from the driver into the controller 25. Similarly the vacuum in the vessel 1 may be measured by pressure sensor 8, and the bleed valve 29 can be adjusted to control the vacuum obtained, for example, from a 60 Hz vacuum pump.

The controller 25 may regulate the inlet valve 23, for example by air-actuation, based on the desired flow of powder from hopper 11, as determined by weight scale 31 on which the hopper rests, and/or based on power consumption measurements reflective of viscosity in the vessel. Thus, higher power consumption may indicate higher viscosity, i.e., larger agglomerates than desired and necessitate stopping or reducing the flow of powder from hopper 11. The temperature of the dispersion can be measured by a temperature sensor 9 and the flow of cold water through cold-water regulator valve 12. Various other schemes for process control, to improve the process, will be apparent to the skilled artisan.

In operation, the aqueous liquid medium 3 is charged to the mixing vessel 1. The mixing device 5 is then activated to mix and create turbulence in the liquid medium 3. A continuous vacuum is obtained in the headspace of the mixing vessel 1 by means of the vacuum source 7. The fumed silica powder 13 contained in the hopper 11 then is drawn into the mixing vessel 1 through the line 15 below the surface 17 of the aqueous liquid medium 3 and at a point of high turbulence therein.

After delivery of the fumed silica powder solids 13, the vacuum and mixing are continued until an essentially gas free dispersion of proper particle size distribution is formed. In one embodiment, for example, this can be accomplished in less than 1 hour, when employing a vessel having a 10 gallon working capacity.

The dispersion is diluted for stability and then discharged through the discharge end, for use in making a coating composition for an inkjet recording media. Various other classes of ingredients may be added to finalize the coating composition or "color," which generally includes binder, any crosslinking agents, coating aids, and the like. Other additives that optionally can be included in coating compositions for ink-receiving layers include pH-modifiers like nitric acid, rheology modifiers, surfactants, UV-absorbers, biocides, lubricants, dyes, dye-fixing agents or mordants, optical brighteners, and other conventionally known additives. These additives can be added with the polymeric binder or added in a separate step to the fumed silica.

Since the inkjet recording element may come in contact with other image recording articles or the drive or transport mechanisms of image-recording devices, further additives such as matte particles and the like may be added to the inkjet recording element to the extent that they do not degrade the properties of interest.

Suitably, the polymeric binder added to the silica dispersion, as a coating composition for a gloss-producing ink-receiving layer can comprise, for example, a hydrophilic polymer such as poly(vinyl alcohol), polyvinyl acetate, polyvinyl pyrrolidone, gelatin, poly(2-ethyl-2-oxazoline), poly(2-methyl-2-oxazoline), poly(acrylamide), chitosan, poly(ethylene oxide), methyl cellulose, ethyl cellulose, hydroxyethyl cellulose, hydroxypropyl cellulose, etc.

The particle-to-binder weight ratio of the fumed silica particles and binder employed in the coating composition for a porous gloss-producing ink-receiving layer can range between about 100:0 and 60:40, preferably between about 100:0 and 90:10. In general, a composition having particle-to-binder ratios outside the range stated, in the resulting layer, will usually not be sufficiently porous to provide good image quality. In a preferred embodiment of the invention, the volume ratio of the particles to the polymeric binder is from about 1:1 to about 15:1.

A dye mordant can be employed in the coating composition obtained using the present dispersion method, usually at least in the coating composition for the image-receiving upper layer and optionally also an intermediate layer between an upper-most image-receiving layer and a base layer nearest the support. The mordant can be any material that is substantive to the inkjet dyes. The dye mordant removes dyes from dye-based ink received from the ink-retaining layer and fixes the dye within the one or more dye-trapping layers. Examples of such mordants include cationic lattices such as disclosed in U.S. Pat. No. 6,297,296 and references cited therein, cationic polymers such as disclosed in U.S. Pat. No. 5,342,688, and multivalent ions as disclosed in U.S. Pat. No. 5,916,673, the disclosures of which are hereby incorporated by reference. Examples of these mordants include polymeric quaternary ammonium compounds, or basic polymers, such as poly(dimethylaminoethyl)-methacrylate, polyalkylenepolyamines, and products of the condensation thereof with dicyanodiamide, amine-epichlorohydrin polycondensates. Further, lecithins and phospholipid compounds can also be used. Specific examples of such mordants include the following: vinylbenzyl trimethyl ammonium chloride/ethylene glycol dimethacrylate; poly(diallyl dimethyl ammonium chloride); poly(2-N,N,N-trimethylammonium)ethyl methacrylate methosulfate; poly(3-N,N,N-trimethyl-ammonium)propyl methacrylate chloride; a copolymer of vinylpyrrolidinone and vinyl(N-methylimidazolium chloride; and hydroxyethyl-cellulose derivatized with 3-N,N,N-trimethylammonium) propyl chloride. In a preferred embodiment, the cationic mordant is a quaternary ammonium compound.

In order to be compatible with the mordant, both the binder and the polymer in the layer or layers in which it is contained should be either uncharged or the same charge as the mordant. Colloidal instability and unwanted aggregation could result if a polymer or the binder in the same layer had a charge opposite from that of the mordant.

In one embodiment, the coating composition obtained using a fumed silica dispersion made according to the present invention, for use in a porous upper image receiving layer, may independently comprise dye mordant in an amount ranging from about 2 parts to about 40 percent by weight of solids, preferably 10 to 25 percent, more preferably about 15 parts by weight. The composition for the upper layer preferably is the layer containing substantially the highest concentration and amount of polymeric mordant.

Typically, the dispersion of fumed silica from the mixing vessel, forming a first composition, is combined with a second composition comprising a polymeric binder, for example, by returning the filtered product to the dispersion vessel and adding the second composition through the vessel cover under vacuum. The optional mordant is preferably combined with the second composition prior to mixture with the first composition. In accordance with a preferred embodiment, the dispersion and the composition comprising a binder are withdrawn from their respective vessels or containers, and combined into one mixture in a closed system under pressure in the absence of air.

Finally, the dispersion made by the present method can be used for manufacturing a porous inkjet recording element comprising a plurality of layers and comprising at least one image-receiving layer, which method of manufacture comprises the steps of coating a composition having between 30 and 70 percent, by weight of the coating composition and greater than 50 percent, by weight of the solids, of fumed silica particles having an average particle size of under 300 nm, the composition comprising a fumed silica dispersion made by the present method and further comprising binder and optional additives; wherein the method of manufacture further comprising drying the coating; and calendering the coating to a 20-degree gloss of at least 15 Gardner units.

In a preferred method, a base layer is coated below the image-receiving layer and any additional layers. In one preferred embodiment, the image-receiving layer is curtain coated and the base layer is rod coated.

Optional other layers, including subbing layers, overcoats, further intermediate layers between the base layer and the upper layer, etc. may be coated by conventional coating means onto a support material commonly used in this art. Coating methods may include, but are not limited to, wound wire rod coating, slot coating, slide hopper coating, gravure, curtain coating and the like.

EXAMPLES

Measurement of Particle Size

The volume-weighted, particle size distribution of fumed silica dispersions is measured by a dynamic light scattering method using a HORIBA LA-920 nanoparticle analyzer and/or MICROTRAC ultrafine particle analyzer (UPA) Model 150 from Leeds & Northrop. The analysis provides percentile data that show the percentage of the volume of the particles that is smaller than the indicated size. The 50 percentile is known as the median diameter, which is referred herein as median particle size. The volume-weighted mean particle size diameter is calculated from the area distribution of the particle size as described in the MICROTRAC Ultrafine Particle Analyzer (UPA) Model 150 manual. The standard deviation describes the width of the particle size distribution. The smaller the standard deviation the narrower the width of the distribution.

General Description of Preparation of Fumed Silica Dispersions

Fumed silica dispersions were made according to the process of the invention having the general formulas itemized below. Percentages are given on the basis of weight of the final dispersion product.

TABLE 1

| | Cationic | | Anionic | |
| --- | --- | --- | --- | --- |
| Ingredients | High surface Area Wt (%) | Low Surface Area Wt (%) | High surface Area Wt (%) | Low Surface Area Wt (%) |
| Initial Water | 44.9 | 42.2 | 46.5 | 42.3 |
| Fumed Silica | 19.3 | 34.5 | 20 | 35 |
| Final Water Dilution | 32 | 21.9 | 33.1 | 22 |
| pH Adj (active, NaOH) | 0 | 0 | 0.4 | 0.7 |
| Stabilizer (active, pDADMAC) | 3.8 | 1.4 | 0 | 0 |

The above-identified formulations are made up as follows. The cooling jacket is supplied with cool water (<20° C.). The vessel is charged with the initial water and the powder hopper is charged with the fumed silica having the particle sizes mentioned below. The mixer is set at a tip speed of 4300-5000 ft/min (1300 to 1500 m/min) and the vacuum level in the vessel is set to 5-10 inch Hg (0.17 to 0.33 atmosphere). The powder inlet valve is opened to allow the fumed silica to be transferred to the mixing zone of the vessel, where incorporation and wetting of the fumed silica takes place. To allow the material to properly wet out and to keep any dry powder from reaching the top surface of the vessel, the powder flow rate is controlled by intermittently opening and closing the powder inlet valve. The flow rate is adjusted depending on the solids concentration at any given instant during the addition and the surface area/size of the fumed silica particles. After completion of the fumed silica addition, the powder valve is closed and the dispersion is allowed to de-agglomerate by continuing to mix the dispersion at the above-described speed. As the de-agglomeration occurs, i.e., the viscosity of the dispersion decreases, the mixing power supplied to the mixer will decrease. During this stage and during addition of the fumed silica, the contents of the vessel are kept at a low temperature (<35° C.) to prevent re-agglomeration. Once the desired dispersion quality is obtained, which can be verified by particle size analysis, the final water dilution is added to the vessel. For anionic fumed silica dispersions, stabilization is accomplished by adjusting the pH to approximately 10 (typically ammonia, NaOH, or KOH). For a cationic fumed silica dispersion, stabilization can be accomplished by changing the fumed silica particles to a positive charge, typically, by adding a low molecular weight poly(DADMAC) and adjusting the pH to approximately 4, if necessary. Finally, the material is filtered to remove any residue or contaminates and removed from the vessel.

Example 1

The following example illustrates the process for making an anionic dispersion of AEROSIL 200 fumed silica at 20% solids concentration. A 14.6 gallon ($5.53 \times 10^4$ cc) vessel having a 10 gallon ($3.78 \times 10^4$ cc) working capacity (Charles Ross and Son Company, Haupauge, N.Y.) was modified with an inlet and flush bottom ball valve. The flush bottom ball valve was a T-316 stainless steel 1-inch (2.54 cm) flush tank ball valve, with a tri-clamp for connection to the conduit for fumed silica powder. A vessel jacket was supplied with cool water (10° C.). An air/oil lift system Model HSD-005 from Charles Ross and Co (Haupauge, N.Y.) was used to raise or lower the vacuum cover and mixing device including a Cowles blade at the distal end of a shaft extending through the cover, which was connected to a 5 HP (3.73 kW), 60 Hz motor. An elongated baffle was welded to the cover lid for lowering into the vessel adjacent the sides thereof. The vessel was charged with the initial 19.4 kg of water and the powder hopper was charged with 9 kg of AEROSIL 200 fumed silica. The 5.5 inch (14.0 cm) Cowles mixer was set at a tip speed of 5000 ft/min (1500 m/min) or 3400 rpm, and the vacuum level in the vessel was set to 6 inch Hg (1.2 atm). The powder inlet valve was opened to allow the AEROSIL 200 fumed silica to be transferred to the mixing zone of the vessel, where incorporation and wetting takes place. The first 3 kg of the powder was delivered at 0.9 kg/min, the second 3 kg of the powder was added at 0.3 kg/min, and the remaining 3 kg of the powder was added at 0.15 kg/min. After completion of the fumed silica addition, the powder valve was closed and the dispersion allowed to de-agglomerate at 3400 rpm for approximately 40 min. Once the desired dispersion quality was obtained, which can be verified by particle size analysis, the dispersion was diluted by adding 13 kg of water to the vessel. Anionic stabilization was accomplished by adjusting the pH to approximately 10 by adding 2 kg of 9% NaOH solution (0.18 kg dry NaOH). Finally, the material was filtered with a 10 μm absolute removal rating to remove any residue or contaminates and removed from the vessel. The quality of the dispersion was determined to be excellent with mean particle size=120 µm and particle size standard deviation=31 µm. No agglomerated material was found in the filter or in the vessel.

Example 2

The process of making a cationic dispersion of AEROSIL 90 fumed silica at 35% solids concentration was carried out as in Example 1, with the following modifications. The powder hopper was charged with 16 kg of AEROSIL 90 fumed silica. The first 6 kg of the powder was delivered at 0.9 kg/min, the second 5 kg of the powder was added at 0.3 kg/min, and the remaining 5 kg of the powder was added at 0.15 kg/min. After completion of the fumed silica addition, the powder valve was closed and the dispersion is allowed to de-agglomerate at 3400 rpm for approximately 40 min. Once the desired dispersion quality was obtained, which can be verified by particle size analysis, the dispersion was diluted by adding 10 kg of water to the vessel. Cationic stabilization was accomplished by adding 0.7 kg of very low molecular weight (Mw=25,000) 35% poly(DADMAC) solution. Finally, the material was filtered with a 10 µm absolute removal rating to remove any residue or contaminates and removed from the vessel. The quality of the dispersion was determined to be excellent with mean particle size=140 µm and particle size standard deviation=34 µm. No agglomerated material was found in the filter or in the vessel.

Comparison Example 3

A procedure similar to Example 1 was carried out, except a vessel with a multi-axis (rotor-stator, anchor and Cowles blade) mixer was used with the powder input into the rotor-stator head. The material collected on the anchor and in the rotor head. Complete agglomeration occurred with only 70% of the powder added.

Comparison Example 4

A procedure similar to Example 2 was carried out, except a vessel with powder entering at the side of the vessel was used. The fumed silica clogged the powder entry and less than 50% of the powder could be added.

The invention has been described with reference to a preferred embodiment; however, it will be appreciated that variations and modifications can be effected by a person of ordinary skill in the art without departing from the scope of the invention.

| PARTS LIST: | |
|---|---|
| 1 | mixing vessel |
| 2 | mixing blade |
| 3 | aqueous liquid medium |
| 4 | mixer shaft |
| 5 | mixing device |
| 6 | baffle |
| 7 | vacuum source |
| 8 | pressure sensor |
| 9 | temperature sensor |
| 10 | cooling jacket |
| 11 | hopper |
| 12 | cold-water valve regulator |
| 13 | fumed silica powder material |
| 15 | line |
| 17 | surface of the aqueous liquid medium in the mixing vessel |
| 19 | discharge end of mixing vessel |
| 23 | inlet valve |
| 25 | controller |
| 27 | mixer driver |
| 29 | bleed valve for vacuum source |
| 31 | weight scale |

The invention claimed is:

1. A method for dispersing and wetting fumed silica powder, comprising fumed silica particles, in an aqueous medium comprising the steps of:
   (a) providing a vessel equipped with a cover lid and a radial flow mixer, one or more baffles, means for cooling the vessel, an outlet for removing a final dispersion, and an inlet for the fumed silica powder, wherein the inlet is located on the vessel bottom below the radial flow mixer and radially offset from the axis of the radial flow mixer, wherein the inlet for the fumed silica powder is connected to, or formed from, a flush bottom valve;
   (b) charging the vessel with an aqueous liquid comprising at least 50 percent by weight water;
   (c) subjecting the aqueous liquid in the vessel to vacuum and high-shear radial flow mixing;
   (d) drawing the fumed silica powder into the vessel through the inlet, which inlet is below the surface of the aqueous liquid, while maintaining the temperature of the dispersion below 35° C., wherein the fumed silica powder is added until at least 30% solids are present;
   (e) maintaining the mixing for a period sufficient to break up non-colloidal aggregates of fumed silica powder;
   (f) reducing solids concentration in the vessel by at least 5 percent solids; and
   (g) filtering the dispersion to reduce presence of impurities and agglomerates;
   wherein the flush bottom valve is a ball valve.

2. The method of claim 1 wherein surface area of the fumed silica particles used to make the dispersion is 90 to 250 m$^2$/g.

3. The method of claim 1 wherein bulk density of the fumed silica particles used to make the dispersion is less than 100 g/l.

4. The method of claim 1 wherein the aqueous liquid comprises greater than 95 percent by weight water.

5. The method of claim 1 wherein the weight percent of dispersed particles is greater than 40 weight percent.

6. The method of claim 1 wherein the fumed silica particles are characterized by a mean secondary particle size of less than 250 nm in the filtered dispersion.

7. The method of claim 6 wherein the fumed silica particles are characterized by a mean secondary particle size of less than 150 nm.

8. The method of claim 1 wherein the pH of the dispersion is adjusted to a pH of 8 to 10.

9. The method of claim 1 wherein at least 90 volume percent of the dispersed fumed silica particles have a diameter smaller than 200 nm.

10. The method of claim 1 further comprising withdrawing the dispersion from the vessel to form a first composition and combining the first composition with a second composition comprising a polymeric binder.

11. The method of claim 1 wherein one to four elongated baffles, parallel to a mixer shaft for the radial flow mixer, is attached to a removable cover lid for the vessel such that one or more baffles can be lowered into the vessel adjacent an inside side wall of the vessel without being attached to the vessel.

12. The method of claim 1 wherein the flush bottom valve is a ball valve comprising a moveable control element that partially or slightly extends above the vessels internal bottom-wall surface, thereby providing zero dead space in the vessel.

13. The method of claim 12 wherein the flush bottom valve forms a water-tight seal, so the fumed silica powder on an upstream side of the control element remains dry.

14. The method of claim 1 further comprising process control for simultaneously controlling the speed or power of a mixer driver, the vacuum in the vessel, and the flow of fumed silica powder into the vessel.

15. A method for dispersing and wetting fumed silica powder, comprising fumed silica particles, in an aqueous medium comprising the steps of:
    (a) providing a vessel equipped with a cover lid and a radial flow mixer, one or more baffles, means for cooling the vessel, an outlet for removing a final dispersion, and an inlet for the fumed silica powder, wherein the inlet is located on the vessel bottom below the radial flow mixer and radially offset from the axis of the radial flow mixer, wherein the inlet for the fumed silica powder is connected to, or formed from, a flush bottom valve;
    (b) charging the vessel with an aqueous liquid comprising at least 50 percent by weight water:
    (c) subjecting the aqueous liquid in the vessel to vacuum and high-shear radial flow mixing;
    (d) drawing the fumed silica powder into the vessel through the inlet, which inlet is below the surface of the aqueous liquid, while maintaining the temperature of the dispersion below 35° C., wherein the fumed silica powder is added until at least 30% solids are present:
    (e) maintaining the mixing for a period sufficient to break up non-colloidal aggregates of fumed silica powder;
    (f) reducing solids concentration in the vessel by at least 5 percent solids; and
    (g) filtering the dispersion to reduce presence of impurities and agglomerates;
    wherein the radial flow mixer comprises a substantially flat, circular blade with a saw tooth arrangement at the periphery.

16. The method of claim 15 wherein the flush bottom valve is a ball valve.

17. The method of claim 15 wherein the tip speed of the blade is at least 3000 ft/min tip speed during the dispersion process, and 0.25 to 1 horsepower per gallon is provided to the radial flow mixer by a motor driver.

18. A method for dispersing and wetting fumed silica powder, comprising fumed silica particles, in an aqueous medium comprising the steps of:
    (a) providing a vessel equipped with a cover lid and a radial flow mixer, one or more baffles, means for cooling the vessel, an outlet for removing a final dispersion, and an inlet for the fumed silica powder, wherein the inlet is located on the vessel bottom below the radial flow mixer and radially offset from the axis of the radial flow mixer, wherein the inlet for the fumed silica powder is connected to, or formed from, a flush bottom valve;
    (b) charging the vessel with an aqueous liquid comprising at least 50 percent by weight water;
    (c) subjecting the aqueous liquid in the vessel to vacuum and high-shear radial flow mixing;
    d) drawing the fumed silica powder into the vessel through the inlet, which inlet is below the surface of the aqueous liquid, while maintaining the temperature of the dispersion below 35° C., wherein the fumed silica powder is added until at least 30% solids are present;
    e) maintaining the mixing for a period sufficient to break up non-colloidal aggregates of fumed silica powder;
    (f) reducing solids concentration in the vessel by at least 5 percent solids; and
    (g) filtering the dispersion to reduce presence of impurities and agglomerates;
    wherein the flush bottom valve comprises a control element for regulating flow and an upstream and downstream flange at two ends thereof, wherein the downstream flange is mounted flush to the vessel by welding.

19. The method of claim 18 wherein the distance from the control element of the flush bottom valve to the vessel's internal bottom-wall surface is less than one times the diameter of a conduit supplying the fumed silica power to the vessel.

* * * * *